DELAY LINE

Filed Feb. 25, 1955 2 Sheets-Sheet 1

INVENTOR.
EDWIN A. GOLDBERG
BY J. L. Whittaker
ATTORNEY

INVENTOR.
EDWIN A. GOLDBERG
BY J. L. Whittaker
ATTORNEY 2,852,750
Patented Sept. 16, 1958

2,852,750

DELAY LINE

Edwin A. Goldberg, Princeton Junction, N. J., assignor to Radio Corporation of America, a corporation of Delaware Application February 25, 1955, Serial No. 490,570

10 Claims. (Cl. 333—18)

The present invention relates to an improved delay line and in particular to an improved, electronically controllable delay line.

Delay lines are known which delay one electrical signal an amount of time proportional to the amplitude of a second electrical signal. Such lines are useful in general in any application where it is desired to time modulate the applied electrical signal. In particular, such lines have important application in video recording systems where rapid control of the delay introduced to a signal is required in order to compensate for "flutter," that is, minute variations in time delay in the recorded signal.

One of the serious obstacles in the use of such lines has been that the electronic control signal used to vary the delay of the delay line introduces spurious transients which interfere with the signal being delayed.

It is a principal object of the present invention to provide, in an electronically controllable delay line, a new and improved circuit for eliminating such interfering transients.

It is another object of the present invention to provide, in an electronically controllable delay line, an improved, simulated, electronically controllable capacitive element.

It is yet another object of the present invention to provide an improved, electronically controllable terminating impedance for a delay line.

In a typical embodiment of the invention the control signal used to vary the delay of an electronically controllable delay line is cancelled by applying the signal to a second network such as a second delay line, which is substantially identical with the first delay line, and then combining the outputs of both delay lines in the proper sense to cancel the signal. The signal to be delayed is applied to only one of the delay lines and is unaffected by the combining means.

In one form of the invention the delay elements of the delay line comprise simulated capacitive elements. Each said element includes a variable gain electron discharge device having an input circuit and an output circuit and a capacitive element extending between the input and output circuits. When the gain of the discharge device is changed the effective input capacitance of the device is also changed. The change in gain is readily accomplished by a control signal applied to a control grid of the discharge device.

The terminating resistor element of the delay line also may comprise a variable gain electron control device. It is similar to the simulated capacitive element except that the series circuit between the input and output circuits of the discharge device includes solely resistive means or resistive means in series with capacitive means. Variations in the gain of the discharge device result in variations in the input impedance thereof in an opposite sense to the variations in capacitances of the simulated capacitive elements. Thus, regardless of the capacitance of the delay line the line remains terminated in its approximate characteristic impedance.

The invention will be described in greater detail by reference to the following description taken in connection with the accompanying drawing in which.

In the figures, similar reference numerals refer to similar elements.

Figure 1:
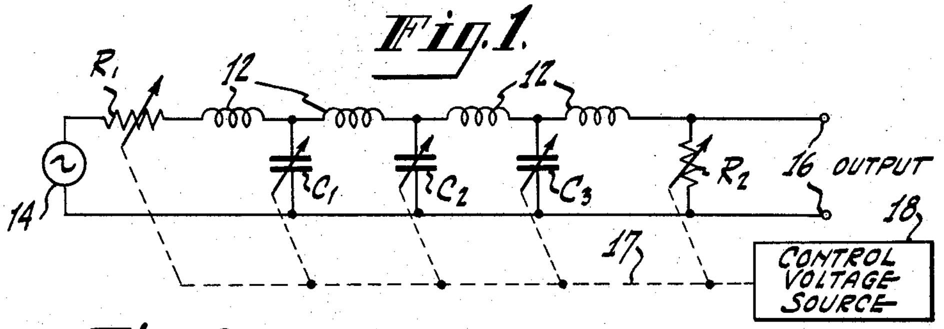
Figure 1 is a generalized schematic circuit diagram of an electronically controllable delay line.

Referring now to the drawing and in particular to Figure 1, delay line 10 includes inductive elements 12, capacitive elements $C_1$, $C_2$ and $C_3$ respectively and terminating impedance elements $R_1$ and $R_2$. Generator 14 applies the signal to be delayed to the input end of the delay line and the output of the delay line is available at terminals 16.

The time delay of a properly terminated delay line for frequencies in the passband is proportional to $\sqrt{LC}$, where L and C are the effective inductance and capacitance of the line, respectively. It is therefore apparent that if either L or C is varied the delay introduced by the line will also be varied. The delay line should be terminated at both ends in its characteristic impedance to avoid reflections. The characteristic impedance $R_c$ of the delay line is equal to $\sqrt{L/C}$. From the above two equations, it is apparent that the terminating resistances of the delay line should be varied at the same time that the inductive or capacitive elements are varied to maintain the delay line properly terminated at all times.

The delay line of Figure 1 is of the type which is electronically variable, that is, a control voltage from source 18 applied to the delay elements of the line varies their value and accordingly varies the delay introduced by the line. The control voltage simultaneously adjusts the terminating impedances $R_1$ and $R_2$ of the line to maintain the line terminated properly at all times.

The delay controlling elements of the line may be varied by a number of means. For example, capacitors $C_1$, $C_2$ and $C_3$ may be formed with dielectrics which exhibit a non-linear charge vs. voltage gradient curve, that is, their incremental dielectric constant is a function of voltage. Such capacitances may be varied by means of a direct potential applied to the capacitor plates. This is indicated in Figure 1 by a dashed line 17 leading from the control voltage source 18 to the arrows passing through the capacitors.

In another form of line, the capacitive elements of the line may be maintained at a constant value and the values of inductive elements electronically varied. One means for effecting such variation is described in Patent No. 2,565,231, dated August 21, 1951, issued to G. Hepp. The terminating impedances of the line may simultaneously be varied in a manner which will be described more fully below.

Figure 2:
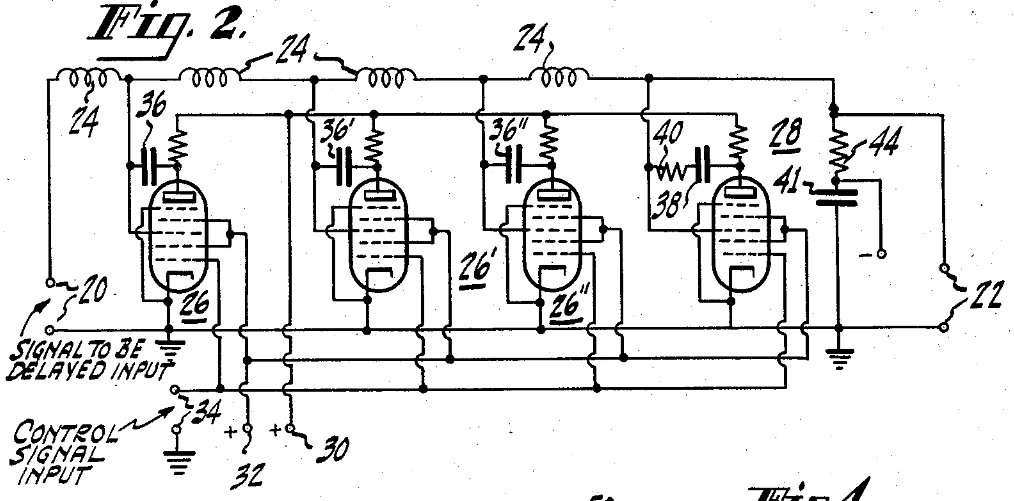
Figure 2 is a schematic circuit diagram of an improved electronically controllable delay line according to the present invention.

Figure 2 illustrates an improved electronically variable delay line in which electron discharge devices are used as the variable capacitive elements and variable terminating impedance elements of the line. The signal to be delayed is applied to terminals 20 and the output signal is available at terminals 22. The inductive elements of the line comprise coils 24 and the capacitive elements of the line are simulated by multigrid tubes 26, 26' and 26". The terminating resistance of the delay line is simulated by tube 28. B+ voltage is applied to all of the tubes via terminal 30 and screen grid voltage is applied to the tubes via terminal 32. The control signal is applied to the control grids of all tubes via terminals 34. Capacitors 36, 36' and 36" are relatively small in value whereas capacitors 38 and 41 are relatively large in value.

Figure 3:
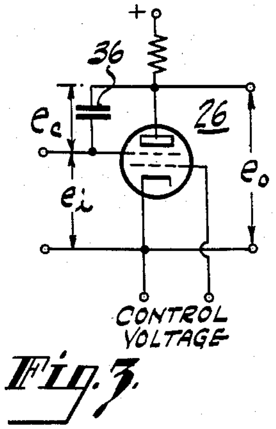
Figure 3 is an equivalent circuit of one of the simulated capacitive elements of Figure 2.

The manner in which a control signal applied to the control grids of tubes 26, 26' and 26" varies the effective capacitance introduced by these tubes will best be understood by reference to Figure 3 and to the analysis which follows. Assume the tube ilustrated in equivalent form in Figure 3 to be tube 26, 26' or 26" as all operate in the same manner.

The output voltage $e_o$ of tube 26 may be defined as $$e_o=e_i(-G) \qquad (1)$$

where $e_i$ is the input voltage to the tube, and G is the gain of the tube.

It will also be seen from Figure 3 that $$e_c=e_i-e_o \qquad (2)$$

where $e_c$ is the voltage across capacitor 36. The current $i_c$ through capacitor 36 is given by the expression $$i_c=\frac{e_c}{-jX_c} \qquad (3)$$

where $X_c$ is the impedance of capacitor 36 and is equal to $$X_c=1/\omega C \qquad (4)$$

where $\omega$ is the angular frequency of the applied signal $e_i$ and C is the capacitance of capacitor 36. Substitution Equations 4, 2 and 1 in 3 gives $$i_c=\frac{e_i-e_o}{-j/\omega C}=je_i\omega C(G+1) \qquad (5)$$

The input impedance $Z_i$ of tube 26 is given by $$Z_i=e_i/i_i \qquad (6)$$

where $i_i$ is the input current to tube 26. It will be noted that the input current is applied to one of the control grids of tube 26 which control grid draws no current and to capacitor 36 which draws substantially the entire input current. Therefore $$i_i=i_c \qquad (7)$$

Substituting Equations 7 and 5 in 6 gives $$Z_i=\frac{-j}{\omega C(1+G)} \qquad (8)$$

From the above expression it can be seen that the input capacitance of each tube is equal to $$C(1+G) \qquad (9)$$

Therefore, as the gain of the tube is varied the capacitance introduced by the tube is also varied. The gain of the tube can readily be varied by a control signal applied to the other control grid thereof as shown in Figures 2 and 3.

In a similar manner it can be shown that variation in the gain of tube 28 varies the effective value of resistance presented by the tube. The voltage $e_{cr}$ across the series combination of resistor 40 and condenser 38 (Fig. 2) is given by the expression $$e_{cr}=e_i'-e_o' \qquad (10)$$

where $e_o'$ is the output voltage of the tube and $e_i'$ is the input voltage to the tube.

The current $i_{cr}$ through resistor 40 and condenser 28 is $$i_{cr}=e_{cr}/Z_{cr}=\frac{e_{cr}}{R-j/\omega C'} \qquad (11)$$

where R is the resistance of resistor 40 and C' is the capacitance of capacitor 38.

Substituting Equation 10 in Equation 11 gives $$i_{cr}=\frac{(e_i'-e_o')}{R-j/\omega C'} \qquad (12)$$

Substituting the equivalent of Equation 1 in Equation 12 gives $$i_{cr}=\frac{e_i'(G+1)}{R-j/\omega C'} \qquad (13)$$

As in the case of Equation 6, $Z_i'$, the input impedance of tube 28, is given by $$Z_i'=e_i'/i_i'=e_i'/i_{cr} \qquad (14)$$

Substituting Equation 13 in Equation 14 gives $$Z_i'=\frac{R-j/\omega C'}{G+1} \qquad (15)$$

The values of resistor 40 and condenser 38 are so chosen that $R>>1/\omega C'$ and therefore Equation 15 can be reduced to $$Z_i'=\frac{R}{(G+1)} \qquad (16)$$

From Equation 16, it can be seen that the input resistance of tube 28 is controllable by varying the gain of the tube. The gain can be varied, of course, by varying the amplitude of the control signal applied to terminals 34 of the circuit shown in Figure 2. It will also be noted that when the control signal is such as to increase the gain of all tubes the effective input capacitances of tubes 26, 26' and 26" increase whereas the effective input resistance of tube 28 decreases. This variation in opposite senses is required to maintain the line terminated in its characteristic resistance at all times as will be clear from the following equation $$R_c=\sqrt{L/C} \qquad (17)$$

where $R_c$=the characteristic resistance of the line.

From Equation 17 it can be seen that when the inductance of the line is maintained constant and the capacitance of the line increases, the value of terminating resistance $R_c$ decreases.

Tube 28 will operate as a variable resistance element if the condenser 38 is sufficiently large in value to serve solely as a B+ blocking capacitor. This is apparent from a brief examination of Equations 11–16 above. Merely delete the term $j/\omega C$ from the equations.

The absolute values of the circuit elements shown in Fig. 2 will depend, of course, on the frequencies of the signals to be delayed. The relative values of the circuit elements are as follows. The reactance of capacitor 38 should not exceed approximately 10% of the value of resistor 40. In general, capacitor 38 is at least ten times larger than capacitors 36, 36' and 36" respectively. In some forms of the invention, as a matter of fact, capacitor 38 may be as much as 100 times greater than capacitors 36, 36' and 36". The reactance of capacitor 41 should not exceed about 10% of the value of resistor 44.

Referring again to Fig. 2, it has been found that if the value of resistor 44 is chosen so that it is about twice the input resistance of tube 28, when the input resistance is a minimum, and about one half the input resistance of tube 28 when its value is a maximum, the net terminating impedance will vary approximately inversely as the square root of the gain of tube 28. This arrangement will provide approximately the correct terminating impedance function if the gains of tubes 26, 26', 26" and 28 track. The net terminating impedance should ideally vary inversely as the square root of the input capacitance of tubes 26, 26' and 26".

In another form of the invention the variation of the termination resistance can be controlled according to the proper law by placing a non-linear network in series with the control grid of tube 28. The function of the network is to adjust the value of the control voltage applied to 28 to approximate the equare root of its normal value so as to vary $R_c$ as a function of $\sqrt{1/C}$.

For the sake of drawing simplicvity only a single termination resistor 28, 44 is shown in Fig. 2. If the delay line is relatively short the line will function in a perfectly satisfactory manner when so terminated. For longer lines it is better to terminate the line at both ends in its $R_c$ as shown in Fig. 1.

It will be apparent to those skilled in the art that the arrangement 14, $R_1$, of Fig. 1 is equivalent to a source of constant current feeding a resistor $R_1$ in shunt across the generator. Therefore, if source 14 is a constant current device such as a pentode, a circuit including tube 28, resistor 44, and capacitor 41 may be connected in shunt across said source. This will terminate the line in its characteristic impedance at its sending end.

Figure 5:
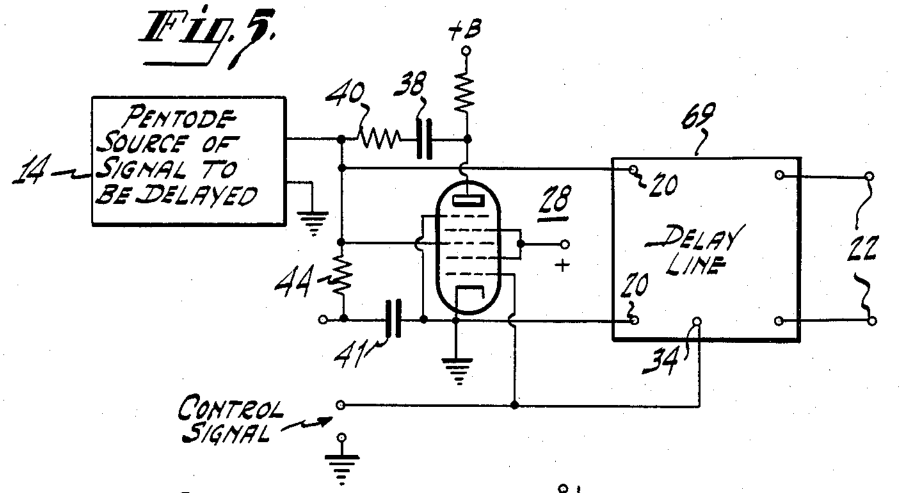
Figure 5 is a circuit diagram partially in block form and partially in schematic form of a modified form of the invention, similar to the one shown in Fig. 2.

A circuit such as described above is shown in Fig. 5. From the foregoing description, its mode of operation will be clear. Delay line 69 is identical to the one shown in Fig. 2. The reference numerals applied to the other circuit elements are the same as those applied to corresponding elements of the circuits of Fig. 2.

Figure 4:
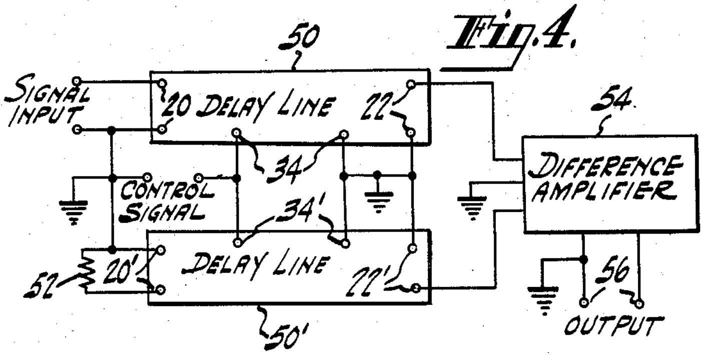
Figure 4 is a block circuit diagram of a preferred form of the present invention.

Figure 4 shows in block diagram form the circuit for eliminating spurious transients due to the control signal. Delay line 50 may be similar to the one shown in Figure 2 and like numbered terminals of delay line 50 bear the same reference numerals as the similar terminals of the delay line of Figure 2. Delay line 50′ is substantially identical with delay line 50 and its terminals bear the same reference numerals as those of line 50 except that the numerals are primed. The control signal is simultaneously applied to both delay lines but the signal to be delayed is applied to input terminals 20 solely of delay line 50. Input terminals 20′ of delay line 50′ are terminated by a resistor 52 having a value equal to the characteristic resistance of delay line 50′. In a preferred form of the invention, resistor 52 comprises an electronically controllable element such as tube 28 of Figures 2 and 5.

In operation, the control signal applied to both delay lines is applied at the outputs of the delay lines to a difference amplifier 54 where they are subtracted from one another. Since both delay lines are substantially identical, the control signals present at the outputs of both lines are of the same amplitude and phase and, therefore, when subtracted from one another produce a zero output at terminals 56. However, the signal to be delayed is applied to only one of the delay lines and therefore is unaffected by the difference amplifier.

Figures 6, 7:
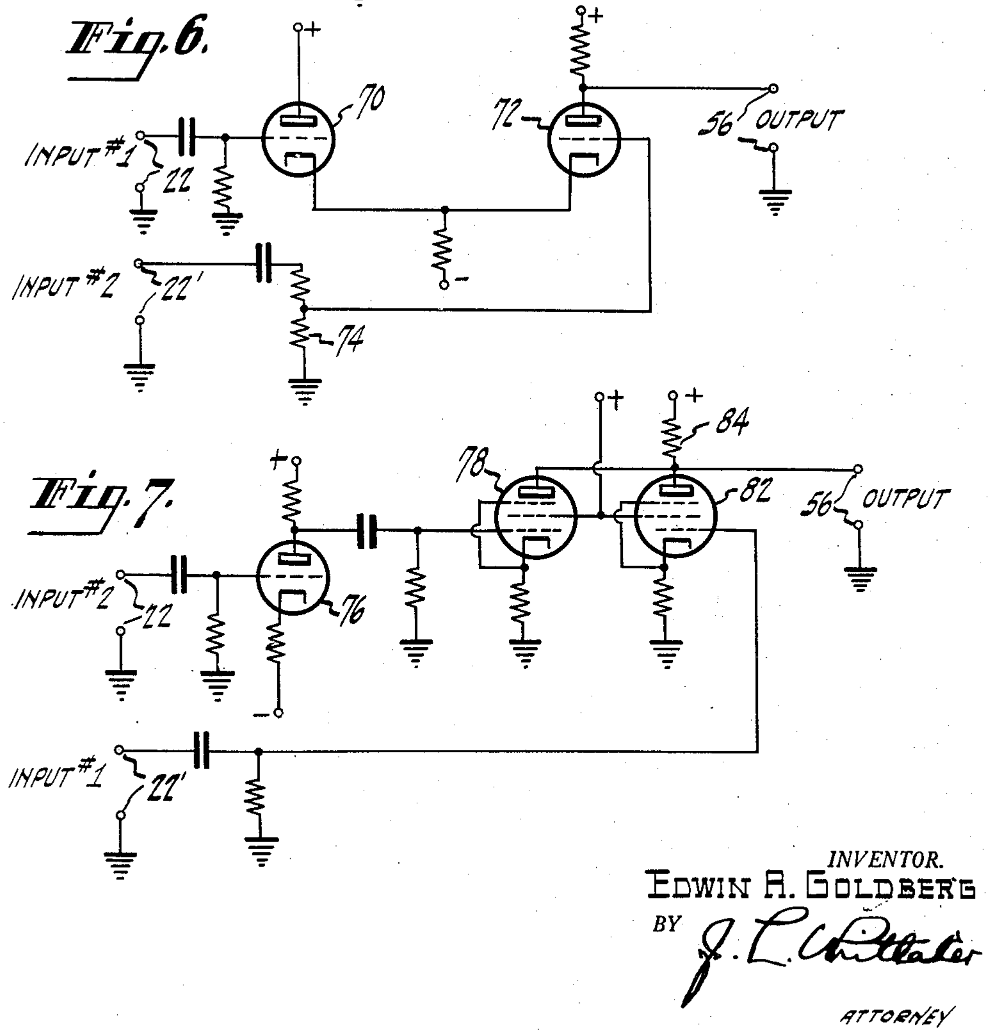
Figures 6 and 7 are schematic circuit diagrams of circuit components which may be employed in the arrangement of Fig. 4.

Some typical circuits of the difference amplifier 54 are shown in Figs. 6 and 7. The circuit of Figure 6 includes a pair of triodes 70, 72, one connected to receive the output of one of the delay lines and the other connected to receive the output of the other delay line. One of the outputs labelled "input 2" is slightly attenuated by resistor 74 so that the gains for the two signals will be identical in magnitude. The output difference signal is available at terminals 56. The second arrangement shown in Figure 7 includes a phase inverting amplifier 76 to which one of the signals is applied. The inverted signal is applied to a first pentode 78 and the signal output of the second delay line is applied to a second pentode 82. The pentodes have a common plate load resistor 84 for signal mixing. The output is available at terminals 56.

What is claimed is:

1. An electrical circuit comprising, in combination, delay line means of the type the delay of which is variable in response to a control signal applied to said line, said line being adapted to receive a signal to be delayed; first circuit means receptive of said control signal for changing its phase and amplitude similarly to said delay line means; means for applying said control signal to said line and to said first circuit means; and other circuit means connected to receive the outputs of said first circuit means and said delay line means and to combine said outputs in the proper sense to cancel said control signal.

2. An electrical circuit as set forth in claim 1, wherein said first circuit means comprises second delay line means substantially identical to the delay line means set forth.

3. An electrical circuit as set forth in claim 2, wherein said other circuit means comprises difference amplifier means.

4. An electrical circuit comprising, in combination, an electronically controllable delay line of the type the delay of which is variable in response to a control signal applied to said line, said line being adapted to receive a signal to be delayed; a second network adapted to receive a control signal and having a phase and amplitude response characteristic relative to said control signal which is substantially the same as that of said delay line; means for applying a control signal to said line and to said second network; and means connected to receive the output of said delay line and that of said network and to combine said outputs in the proper sense to cancel said control signal.

5. In an electronically controllable delay line of the type including control signal input terminals and including inductive elements and capacitive elements at least some of which are electronically variable by means of a control signal applied to said terminals to vary the delay provided by said delay line, and also including a terminating impedance which is also variable by means of said control signal in the proper sense to maintain said line terminated in its characteristic impedance when said elements are varied, a circuit for substantially eliminating the control signal from the output of said delay line comprising, in combination, a second delay line similar to said first delay line, means to apply a control signal to both of said delay lines, the control signal being operative to vary the delay elements and terminating impedance of said second delay line in a manner similar to the variation of the corresponding components in said first delay line; means connected to receive the outputs of both delay lines and being operative to combine said outputs in the proper sense to cancel said control signal, and means to apply a signal to be delayed to only one of said lines.

6. In an electronically controllable delay line having control signal input terminals and having an inductance L, capacitance C and at least one terminating resistor, said resistor having a valve equal to the square root of $L/C$, the delay of said line being controllable by means of a control signal applied to said terminals to vary the value of one of L and C, and simultaneously to vary the value of said terminating resistor to maintain it approximately equal to the square root of $L/C$ as said one of L and C is varied, an arrangement for eliminating said control signal from the output of said delay line comprising, in combination, a second delay line substantially identical to said first delay line, means to apply said control signal to the same terminals of said second delay line as said first delay line so as to simultaneously vary both delay lines in like fashion; and means connected to receive the outputs of both delay lines and to combine said outputs in the proper sense to cancel said control signal.

7. In an electronically controllable delay line as set forth in claim 6, the capacitance of said lines comprising a plurality of electron discharge devices, each said discharge device comprising a variable gain tube having an input circuit and an output circuit; a capacitive element connected in series between said input and output circuits; and circuit means connected to each electron discharge device for varying the gain thereof in accordance with a parameter of said control signal.

8. In an electronically controllable delay line as set forth in claim 7, said resistor comprising a variable gain electron discharge device having an input circuit and an output circuit; a capacitor element; a resistor element, said resistor element and capacitor element being connected in series between said input and output circuits, and said circuit means being connected to said last-named discharge device for varying the gain thereof in accordance with a parameter of a control signal.

9. In combination, an electrically controllable delay line having a first input for a signal to be delayed and a second input for a control signal, said delay line having an output providing a delayed signal and an undesired signal resulting from the application to the delay line of said control signal, circuit means having an input and an output, means to apply a control signal to the second input of said delay line and the input of said circuit means, said circuit means being characterized in providing an output signal corresponding with said undesired signal, and a combining circuit coupled to the outputs of said delay line and said circuit means and providing an output devoid of said undesired signal.

10. An electronically controllable delay line comprising a two-conductor line, and inductance element connected in series with one of said conductors, a capacitive element connected in shunt across said two conductors, said capacitive element including an electron discharge device having a cathode, at least two grids, and an anode means to bias said electrodes to produce a flow of electrons through said device, means connecting said cathode to one of said conductors, means connecting one of said grids to the other of said conductors, a capacitor coupled between said one grid and said anode, means to couple a control signal between said cathode and the other of said grids, a resistive termination for said line including a second electron discharge device having a cathode electrode, at least two grid electrodes, and an anode electrode, means to bias said electrodes to produce a flow of electrons through said second electron discharge device, means connecting said cathode electrode to one of said conductors, means connecting one of said grid electrodes to the other of said conductors, a resistor and a blocking capacitor coupled between said one grid electrode and said anode electrode, and means to couple said control signal between said cathode electrode and the other of said grid electrodes.

References Cited in the file of this patent

UNITED STATES PATENTS

| | | |
|---|---|---|
| 2,505,266 | Villem | Apr. 25, 1950 |
| 2,516,812 | Tillman | July 25, 1950 |
| 2,606,973 | Scott | Aug. 12, 1952 |